United States Patent [19]
Bui et al.

[11] Patent Number: 5,259,976
[45] Date of Patent: Nov. 9, 1993

[54] SODIUM ALUMINATE FOR IMPROVING PAINT SPRAY BOOTH EFFICIENCY

[75] Inventors: Nang T. Bui, Aurora; Shu-Jen W. Huang, Naperville, both of Ill.

[73] Assignee: Nalco Chemical Company, Naperville, Ill.

[21] Appl. No.: 878,244

[22] Filed: May 4, 1992

[51] Int. Cl.⁵ ............................................. C02F 1/56
[52] U.S. Cl. ............................... 210/712; 210/724; 210/732; 210/734; 210/930; 134/38; 252/181; 95/188
[58] Field of Search ............... 210/724, 725, 734, 930, 210/712, 732; 55/85; 252/181; 134/38; 427/331

[56] References Cited

U.S. PATENT DOCUMENTS

| | | | |
|---|---|---|---|
| 3,515,575 | 6/1970 | Arnold | 210/930 |
| 5,116,514 | 5/1992 | Bhattacharyya et al. | 210/930 |
| 5,147,557 | 9/1992 | Purnell | 210/930 |
| 5,147,558 | 9/1992 | Purnell | 210/930 |

*Primary Examiner*—Neil M. McCarthy
*Attorney, Agent, or Firm*—John G. Premo; Robert A. Miller; Joseph B. Barrett

[57] ABSTRACT

Sodium Aluminate when used to adjust pH of paint detackifying systems improves the efficiency of polymeric paint detackifiers used in the detackification of paint from paint spray booths and similar equipment.

6 Claims, 1 Drawing Sheet

SODIUM ALUMINATE FOR IMPROVING PAINT SPRAY BOOTH EFFICIENCY

TECHNICAL FIELD OF THE INVENTION

The present invention is in the technical field generally of waste treatment, and more particularly in the technical field of detackification of waste paint, particularly detackification of oversprayed waste paint, particularly detackification of oversprayed paint in paint spray booths.

BACKGROUND OF THE INVENTION

In many systems for automobiles, various household electrical appliances, and the like, the products are coated or painted in enclosed areas referred to generally as paint spray booths. Generally, a significant portion of the paint is oversprayed that is not transferred to the object being coated. Such waste paint is generally referred to as oversprayed paint. The oversprayed paint must be removed daily to keep production running smoothly and promote a quality work environment. Water wash booths are designed to trap most of this oversprayed paint in the booth water. This Water can create difficult maintenance problems if it is not properly treated with chemicals.

The term "paint" as used herein includes paint in its ordinary sense, that is, a mixture of pigment, resin and suitable liquid vehicle that is reasonably fluid and provides a thin and adherent coating when spread on an appropriate surface. The term "paint" also includes other paint-like fluid coating materials. Hence the term "paint" as used herein refers to paints, lacquers, varnishes, base coats, clear coats, primers and the like.

Paint spray booths are generally comprised of a chamber, a duct system for passing an air stream down through the chamber, and a sump or recirculating water system, the bulk of which is located at the bottom of the chamber. The air stream directs the oversprayed paint to the water wash stream that generally captures oversprayed paint and carries it towards the sump. The booth water is generally treated a chemical detackifier so that the oversprayed paint is formed into a paint sludge. These paint sludges typically float at or near the surface and can be removed by skimming or similar means.

The tendency of such paint sludge to float also permits reasonably efficient water recycling, because reasonably sludge free Water can be drawn from or near the bottom of the sump. In some installations, water at least partially withdrawn from the sump is pumped upward to a point where it cascades down the sides of the chamber, forming a vertical curtain of water that protects the chamber walls.

It is important to the efficient operation of such paint spray booths, and to the efficient waste treatment of such oversprayed paint wastes, that the oversprayed paint be detackified when it interacts with the detackification products in the water system, or waste water system. Such interaction may be made with the water present in the booth or with the water recirculated in the water curtain that protects the chamber walls. Detackification means that the adhesive properties (tackiness) of the paint overspray are minimized or eliminated. It is undesirable to have such overspray adhere to the walls of the paint spray booth chamber or the walls of the sump. It is also undesirable to have such paint overspray adhere to any surface that may be encountered in the spray booth, or during its removal from the spray booth and subsequent disposal. Paint detackification is achieved by the use of paint detackification products which have as an active ingredient a water soluble polymer.

These agents promote the formation of paint sludge that can be efficiently removed and dewatered. Removal and dewatering of paint sludge is affected by a plurality of sludge characteristics, including besides detackification, cohesiveness to promote easy sludge removal, low water content for total volume reduction, low or no solvent encapsulation to reduce the hazardous properties of the sludge and the like. High solids and minimum solvent are requirements under most sludge landfill disposal regulations. An initial dewatering of the sludge occurs during sludge removal, and the sludge collected may be further dewatered using such devices a plate and frame filter, a vacuum filter, a centrifuge, a twin belt press or the like. For effective dewatering during the sludge removal, and when the collected sludge is further dewatered using a dewatering device, the sludge paint must be well detackified.

It is also desirable that a paint detackifying agent have a high load capability in the system in which it is used. A detackifying agent of high loading capability is one that can withstand a high volume of oversprayed paint before exhaustion. that is, the point at which detackification performance falls to an unacceptable level. In a process where the paint detackifying agent is fed to the water system continuously, for instance on a constant feed mode, the loading capacity of the detackifier will determine the maintenance feed rate. A detackifier with a high loading capacity will require a lower maintenance feed rate. If a system is not continuous and is instead run to, or close to, the point of exhaustion of the detackifier present, a detackifier of high loading capability would permit the water system to handle a higher volume of oversprayed paint before shutdown. A paint detackifying agent of high loading capability (amount of oversprayed paint detackified per unit additive) is cost efficient, and in a continuous operation the loading capability of the paint detackification agent is seen from the lower maintenance levels required.

It is also highly desirable that the detackifying agent be dispersible in the waste water system with reasonable efficiency. An additive that requires auxiliary equipment for mixing and dispersing would increase the operation costs and serving time required. Hence, it is desirable that the detackifying agent can be provided in suitable form for charging directly to the waste water system, and be dispersed homogeneously therein rapidly, at normal operating temperatures and without agitation other than that provided by the normal operation pumping action and the like.

As noted above, the paint sludge that is formed generally floats on or near the top of the water present in the sump. Generating such floating sludge, and reducing the amount of sinking sludge, is desirable and extends the time between pit cleanings. Generation of floating sludge in some systems is assisted by air flotation means. The removal of the sludge on or near the top of the water may be accomplished using one or more or a variety of systems, including without limitation by skimming, by screening or straining, by dispersing the sludge in the water of the system and then discharging a portion of such water, and the like. Sinking sludge is generally removed at given periods. In some operations, the sludge removal is continuous and such continuous sludge removal systems frequently use a pedal wheel, skimmer, or a side-stream sludge removal when an air assisted floating unit it used to separate the sludge from the water. As noted above, efficient sludge removal is dependent in part on sludge characteristics. The paint should be well detackified and the sludge preferably should be cohesive.

To improve the efficiency of paint detacktification systems which use polymeric agents, it is customary to adjust the pH of the water of the systems to an alkaline range. A typical pH range would be between 7.5 to about 10, with a more typical range being 7.5 to 9. A common range is between 8 and 9. This pH adjustment, which also includes pH maintenance is normally made using an alkali metal hydroxide such as sodium hydroxide or potassium hydroxide or mixtures thereof.

THE INVENTION

Figure 1:
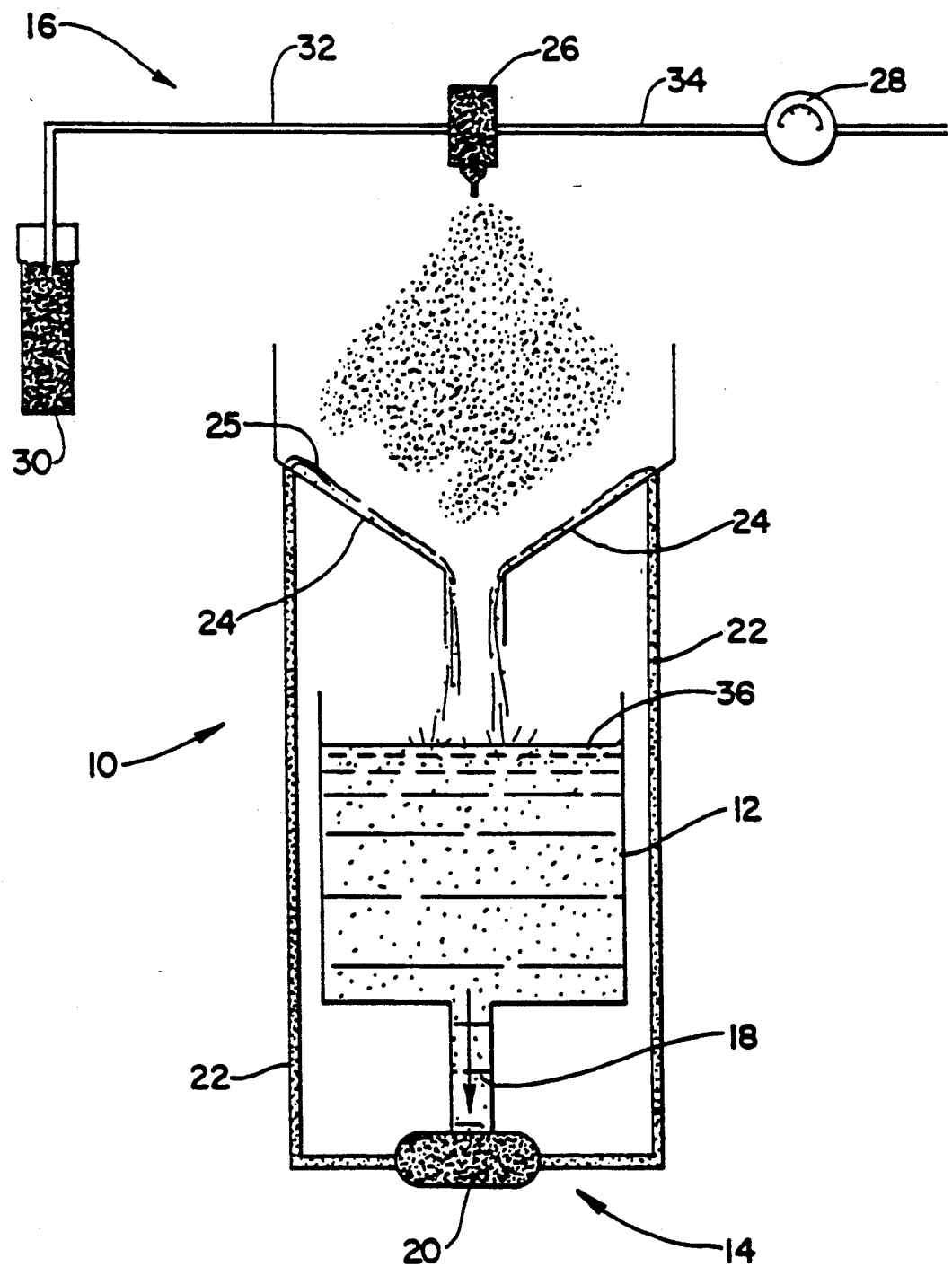
FIG. 1 is a schematic side view of a recirculating unit used in a Recirculator Test described hereinafter.

The present invention comprises a process of the type where oversprayed paint is detackified by contact with the water of a waste water system which water has its pH adjusted to an alkaline pH and contains a water soluble polymeric detackifying agent. The improvement which this invention brings to the art comprises using sodium aluminate as the pH adjusting agent.

THE DETACKIFICATION WATER SOLUBLE POLYMERS

A variety of polymers have been described in the literature, as being capable of effectuating good paint detackification. Most commonly, the polymers are cationic. They may be nonionic, such as acrylamide polymers. In certain instances, the acrylamide polymers may be cationic e.g. prepared by reacting acrylamide or a substituted acrylamide with cationic monomers. Typical of such cationic monomers are those set forth in Table 1.

TABLE 1

| Abbreviation | Cationic Mer Units |
| --- | --- |
| DMAEM.H$_2$SO$_4$ | Dimethylaminoethylmethacrylate sulfuric acid salt |
| DMAEM.MCQ | Dimethylaminoethylmethacrylate methyl chloride quaternary ammonium salt |
| DMAEM.MSQ | Dimethylaminoethylmethacrylate methyl sulfate quaternary ammonium salt |
| DMAEA.MCQ | Dimethylaminoethylacrylate methyl chloride quaternary ammonium salt |
| APTAC | Acrylamidopropyltrimethyl ammonium chloride |

These cationic acrylamide polymers may be further modified by reacting them with small amounts of anionic components.

Many commercial detackifying polymers are blended with a water soluble salt of an amphoteric metal salt such as alum, zinc chloride or ferric chloride to enhance their performance. Typical of such products are those described below as polymer 1 and polymer 2. which are blended with alum.

POLYMER 1

This is a commercial material which is polyacrylamide blended with alum.

POLYMER 2

This Polymeric product is a copolymer of acrylamide with dimethylaminoethylmethacrylate. The mole percent of acrylamide in this copolymer is within range of 65 to 85% with the DMAEM being the balance. This polymer contains between 33% to 83% by weight of alum hydrate.

These two polymeric products represent commercial materials that are greatly enhanced by the use of sodium aluminate as a pH adjusting agent. Other polymeric detackifying materials also benefit by the substitution of sodium aluminate for conventional alkalis. Polymers that are substantially improved in their performance as paint detacktifiers have intrinsic viscosities of from about 0.4 to about 4.0. Typically this intrinsic viscosity of these polymers would be between 1.0 to about 3.8.

THE ALUMINUM SALTS

The aluminum salt will be most often an aluminum sulfate, preferably aluminum sulfate octadecahydrate, which has the chemical formula of $Al_2(SO_4)_3 18H_2O$, and while the octadecahydrate form is often referred to itself as "alum", the term "alum hydrate" is used sometimes for the octadecahydrate form of aluminum sulfate. Since alum hydrate is about 50 weight percent aluminum sulfate (51.3 wt. percent if the alum hydrate contains the total theoretical water), parameters set forth herein that are based on the weight of alum hydrate are easily convertible to parameters based on weight of $Al_2(SO_4)_3$. Typically polymer/aluminum sulfate composition contains from about 0.1 to about 8.0, or 10.0, parts by weight of alum hydrate (aluminum sulfate as the octadecahydrate) for each part by weight of the polymer.

THE pH OF THE WASTE WATER SYSTEMS

The paint spray waste water system, as previously indicated are adjusted to an alkaline pH, whereby the efficiency of the paint detackification operation utilizing polymeric detackifiers is improved. The minimum pH is usually about 7.5. with the upper limit being about 9.5 to 10. A typical pH would be 7.5 to 9, and an even more typical range being from about 8–9. The pH, of course, will depend on the particular paint being detackified, the detackification agent being employed or variables that are known to those skilled in the art.

SODIUM ALUMINATE

Sodium Aluminate is a well known chemical of commerce and is prepared by digesting alumina in an excess of caustic. Commercial sodium aluminate products may be either solids or liquids. In the practice of this invention, it is practical to use a liquid form sodium aluminate. One such form, which is found to give good results is a material sold under the trade name Nalco 8738 (NTB /SWH)

While this material represents a preferred form of sodium aluminate, it is understood that other aluminates having a varying amounts of excess sodium oxide may be used without departing from the spirit of the invention.

EVALUATION OF THE INVENTION

Recirculator Test

In the Examples, the paint detackification performance of the process of the present invention was determined using a Recirculator Test, as follows. Referring to FIG. 1, there is shown a recirculator testing unit, designated generally by the reference numeral 10. The recirculator testing unit 10 is comprised of a recirculator vessel 12, a means for recirculating fluid 14, and a paint spray assembly 16. The recirculator vessel 12 is open at its top and bottom to the recirculating means 14. The recirculating means 14 is comprised of a vessel duct 18, a recirculator pump 20, an encircling water-way 22, and a funnel 24. The vessel duct 18 interconnects the vessel 12 with the recirculator pump 20, which pump 20 is disposed below the vessel 12. The encircling water-way 22 encircles the vessel 12 about the vessel's entire side-circumference. The water-way 22 is interconnected to the pump 20, and provides a channel for the fluids passing through the duct 18 and pump 20, upward to the funnel 24, where the fluid falls back in to the vessel 12, forming a water curtain 25 along the upper surface of the funnel 24. The paint spray assembly 16 is comprised of a spray gun 26, disposed above the funnel 24, a pressure regulator 28, means for providing pressure (compressed air, not shown). a paint supply 30, and a first and second line 32, 34 interconnecting respectively the spray gun 26 to the paint supply 30 and pressure regulator 28. The Recirculator Test is conducted with the recirculator testing unit 10 as follows. 19,000 ml. of tap water is charged to the recirculator vessel 12 and then the pump 20 is started. The pump 20 draws the fluid (water, and later water and additive) through the duct 18 and pumps it upward through the encircling water-way 22, where the fluid flows down the funnel 24, back into the vessel 12.

An initial charge of detackifying agent is then added, while such pumping is continued for the duration of the test. After the first five minutes of pumping water and detackifying agent from the vessel up to the water-way 22, alkali is added as needed to adjust the pH of the vessel contents to about 8.6. or at least to within the range of from a pH of 8 to a pH of 9. When a stable pH reading at the desired pH is obtained (measured with a standard meter) the paint spray is commenced. The gun 26 is an air atomized spray gun that is directed downward into the funnel 24. The paint spray assembly 16 is preadjusted so as to spray paint into the funnel 24 at a rate of from about 1.5 to about 2.0 ml. of paint per minute, using an air pressure of from about 20 to about 30 psi. The spray gun 26 is disposed about 12 inches above the top rim of the funnel 24. The expected result of such paint spraying and fluid recirculating is the formation of a paint sludge 36 which floats on the top of the vessel fluid 38. Such paint sludge 36 is checked at intervals by the tester, using a water-wetted hand to squeeze a sample of the paint sludge between her or his fingers. Such paint sample is thereby evaluated for tackiness and assigned a numerical rating of from 10 to 0, described in more detail below. At the time of the first sampling and testing, the paint sludge must have a rating of at least 6. The paint spraying and sampling continues until the sludge rating falls to 5. at which initial end point the paint spray is interrupted, the floating paint sludge is removed, a maintenance dose of additive is added to the vessel 12, the pH is measured and readjusted if necessary, and then the paint spraying is recommended until the rating of 5 end point is reached with such maintenance dosage. Such maintenance dosage runs are repeated at least three times.

The test results are expresses as a paint/chemical ratio which is the total amount of paint sprayed (in. ml.) during a maintenance dosage run (until the end point of a rating of 5 is reached), divided by the maintenance dosages of the additive used (in ml. of aqueous solution of additive, discussed below). Generally, when a series of additives were tested by this Recirculator Test, a commercial detackification product was also tested as a "standard", and the test results thus can also be expressed as a "Product Replacement Ratio", which is the paint/chemical ratio of the standard divided by the paint/chemical ratio of the additive being compared. A standard paint is sprayed for the Recirulator Test. This standard paint is a clearcoat paint commercially available under the tradename of DCT-3000 from PPG Industries, Inc.

As indicated from the above description of the Recirculator Test, the activity of a maintenance dosage of the detackification agent is being determined, and such activity is being reported numerically in terms of the detackification capacity (volume of paint) per unit additive dosage, and at times also as the relative activity in comparison to the commercial product. The higher the paint/chemical ratio of an additive, the higher is its detackification performance. The lower the product Replacement Ratio, the higher is its detackification performance.

In addition the sludge formation is being observed during the test as to whether the type of sludge being formed is desirable for dewatering properties. The overall best performance may at times be deemed an additive that does not have the highest paint/chemical ratio.

The numerical ratings for the paint sludge samples that are used in the Recirculator Test are set forth in Table 2.

TABLE 2

| Numerical Rating | Summary Description | Paint Sludge Sample Description |
|---|---|---|
| 10 | Perfect | Complete detackification: sludge is soupy. |
| 9 | Excellent | Sludge is non-tacky and non-gritty |
| 8 | Very Good | Sludge is not tacky or gritty, but slightly plastic and may roll. |
| 7 | Good | Sludge is not tacky, but of plastic consistency, rolls and can easily reroll. |
| 6 | OK | Sludge is very slightly tacky, rolls with water and rerolls, and can wash off with rubbing. |
| 5 | Borderline | Sludge may stick slightly to hand but falls off with rubbing. |
| 4 | Unacceptable | Sludge has a slight tack, sticks to hand with pressure, does not rub off, and may roll. |
| 3 | Moderate failure | Sludge does not roll, sticks to hand and smears. |

TABLE 2-continued

| Numerical Rating | Summary Description | Paint Sludge Sample Description |
|---|---|---|
| 2 | Severe failure | Sludge is tacky and smears |
| 1 | Sticky | Smears |
| 0 | Raw paint | Not sludge but more like raw paint. |

The initial charge of a detackifier in the Recirculator Test must in all instances provide initially a rating of 6, and if such rating is not provided by the first dosage of additive, the dosage is increased, when the commercial product is tested, as a standard, the initial charge is always 9.5 ml. of the product (active agents and water), and the maintenance charges are always 10 ml., same basis.

In a number of the following Examples, the polymer identification information includes Reduced Specific Viscosity ("RSV"), and in such instances, the polymer concentration employed for the RSV that is given is generally set forth in parenthesis following the RSV. The solvent employed for these RSV data was 1 molar aqueous sodium nitrate solution.

The us of sodium aluminate in place of NaOH and/or KOH as a source of pH adjustment has significantly improved the paint kill activities of polymers 1 and 2.

Paint samples were evaluated with either Polymer 1 or Polymer 2 in the Recirculator. Either caustic or sodium aluminate was used to maintain the pH between 8–9. The resulting floating paint sludge was periodically checked by the tester wetting his hand with the water, taking a sample of floating sludge between his fingers and squeezing. Any tackiness or stickiness present was a poor kill and spraying should be discontinued.

EXAMPLE 1

Standard Clear Coat PPG DCT-3000 Paint:

Polymer 1:
Caustic              Paint/Polymer 1 = 17/1–18/1
Sodium Aluminate     Paint/Polymer 1 = 40/1–43/1
Sodium Aluminate in place of caustic increased the paint kill activity of Polymer 1 by 122–133%.
Polymer 2 Program:
NaOH (50%) or Caustic    Paint/Polymer 2 = 46/1
Sodium Aluminate         Paint/Polymer 2 = 70/1
In comparison to Polymer 2 program, the use of sodium aluminate increased the paint kill activity of Polymer 2 by 52%.

EXAMPLE 2

BASF 2K Paints (BASF E10CE022:BASF N52CE022 = 1.9:1.0 vol/vol):

Polymer 1 Program:
NaOH (50%) or Caustic    Paint/Polymer 1 = 8/1
Sodium Aluminate         Paint/Polymer 1 = 18/1
Sodium aluminate increased the paint/Polymer 1 ratio by 125%.

EXAMPLE 3

PPG Universal Clear Coat Paint UCC 1000:

Polymer 2 Program:
NaOH (50%) or Caustic    Paint/Polymer 1 = 16/1
Sodium Aluminate         Paint/Polymer 1 = 32/1
In comparison to NaOH (50%) or Caustic, sodium aluminate doubled the paint kill activity of Polymer 1.
Polymer 2 Program:
NaOH (50%) Caustic       Paint/Polymer 2 = 40/1
Sodium aluminate         Paint/Polymer 2 = 52/1
Sodium aluminate increased the paint kill activity of Polymer 2 by 30%.

EXAMPLE 4

Two paint samples (Dupont Clear Coat and Dupont Granda Black) which were believed the hardest paints to be detackified were sampled from a commercial spray booth and tested in the laboratory.

TABLE 3

The Paint/Chem Results of Polymer 1/Mixed Caustic Program versus Polymer 1/Sodium Aluminate Program in the Recirculator Test.

| Paint Type | Paint/Polymer Ratio (a) | Paint/Polymer Ratio (b) |
|---|---|---|
| DuPont Clear Coat | 3/1 | 6.3/1 |
| DuPont Granda Black | 5/1 | 9.3/1 |

(a) Polymer 1/Mixed Caustic Program
(b) Polymer 1/Sodium Aluminate program

Sodium Aluminate was used in place of mixed Caustic Solution to adjust the pH of the Polymer 1 program. In the presence of Sodium Aluminate, the paint to Polymer 1 ratios increased from 3/1 to 6.3/1 for the Clear Coat and from 5/1 to 9.3/1 for the Granda Black. Both paints produced cohesive, but not sticky sludges. Sludges could be rolled and re-rolled between the fingers without smearing off. The sludges floated well and were easily removed from the recirculator.

The recirculator results (Table 4) indicated that the paint kill activity of Polymer 1 increased by 86–110% in the presence of Sodium Aluminate.

EXAMPLE 5

Polymer 1/Sodium Aluminate Program at a Commercial Spray Booth

The Polymer 1/sodium aluminate program wasted for three days. Information regarding polymeric/caustic programs was gathered before the trial started. Although the caustic usage prior to the trial was about 5–7 gallons of mixed caustic solution per day.

On the first two days of the trial, the chemical usage (Polymer 1) was optimized by monitoring the paint kill performance. The paint kill performance was maintained at a scale of 6–7 (see Table 3). On the third day, the paint kill performance was increased to 8–9 scale. More Polymer 1 was used on Day 3.

During all three days, the Polymer 1/sodium aluminate Program performed very well in detackifying the paint and producing floating sludge with clean recirculating water. Sludge removal was excellent. The sludge removed during the three day trial has solids range from 21% to 63% (see Table 4).

TABLE 4

Results of Deposit Analysis of Paint Sludges

| % Sludge Solids | Degree Kill |
|---|---|
| 63 | 6 |
| 50 | 7–8 |
| 42 | 7–8 |
| 39 | 7–8 |

TABLE 4-continued

Results of Deposit Analysis of Paint Sludges

| % Sludge Solids | Degree Kill |
| --- | --- |
| 21 | 9-10 |

The pH was maintained at 8-9 with sodium aluminate. When the sludge was soupy or overkilled (Scale 9-10), a heavy fine fluffy floc carryover was observed in the return water. A commerical flocculent was added to dewater the soupy sludge. During the trial, foam level in the pit was not significant. A total of three gallons of commercial antifoam was used to control the foam in the three-day trial period. The data is summarized in Table 5.

TABLE 5

Daily Chemical Usages and Paint Sprayed

| Day | Polymer 1 | SODIUM ALUMINATE | PAINT GALS. | PAINT/Pol.1 |
| --- | --- | --- | --- | --- |
| 1 | 36.00(*) | 0.00 | 122.00 | 3.4/1 |
| 3 | 13.65(*) | 0.00 | 110.50 | 8.1/1 |
| 4 | 22.75(*) | 0.00 | 121.75 | 5.4/1 |
| 8 | 30.94(*) | 0.00 | 169.25 | 5.5/1 |
| 9 | 2.73 | 2.52 | 109.00 | 39.9/1 |
| 10 | 4.1 | 3.64 | 119.50 | 29.1/1 |
| 11 | 7.74 | 2.99 | 145.50 | 18.8/1 |
| 12 | 0.00 | 0.32 | 35.00 | |

(*) Polymer 1/Mixed caustic Solution program; there was no record of mixed Caustic Solution usage. Accordingly to the plant operator, on average he used about 5-7 gallons of mixed Caustic Solution per day.
In the Polymer 1/Mixed Caustic Solution program, the average paint: Polymer 1 ratio was 5.1:1 and the polymer 1:Sodium Aluminate Solution was between 18.8:1 to 39.9:1.

The results indicated that the paint kill activity of Polymer 1 increased by 300-500% in the presence of sodium aluminate.

We claim:

1. A process where oversprayed paint is detackified by contact with the water of a waste water system which water has its pH adjusted to an alkaline pH and contains a water soluble polymeric detackifying agent the improvement which comprises adding to the waste water system a sodium aluminate having excess sodium oxide to adjust and maintain the pH within said alkaline pH.

2. The process of claim 1 where the water soluble polymeric detackifying agent is a cationic polymer.

3. The process of claim 1 where the water soluble polymeric detackifying agent is an acrylamide polymer.

4. The process of claim 3 where the acrylamide polymer is a cationic acrylamide polymer.

5. The process of claim 3 where alum is also present with the acrylamide polymer.

6. The process of claim 4 where alum is also present with the cationic acrylamide polymer.

* * * * *